No. 879,218. PATENTED FEB. 18, 1908.
J. H. TICKERHOOF.
CURTAIN OPERATING MEANS FOR VEHICLE TOPS.
APPLICATION FILED FEB. 2, 1907.
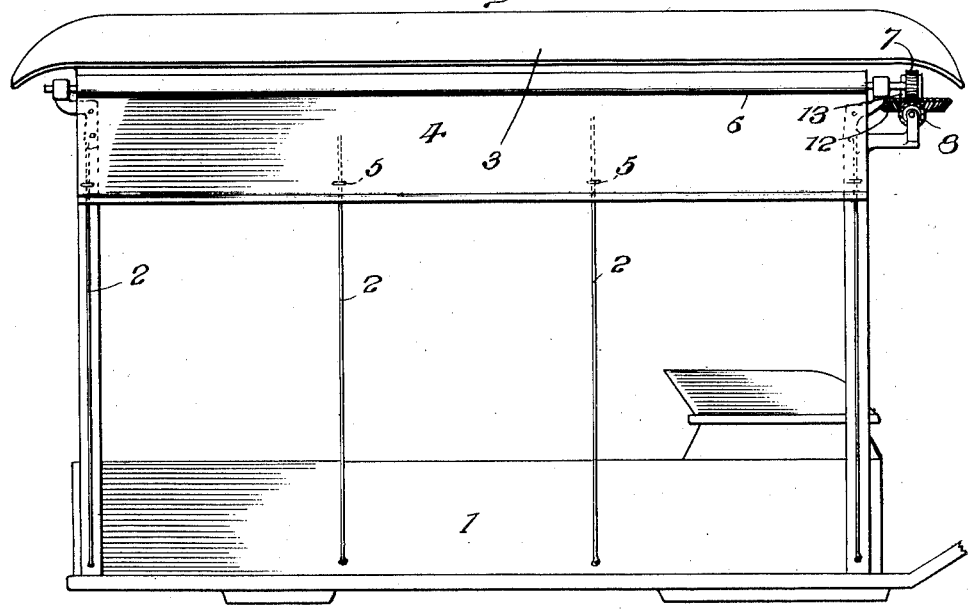
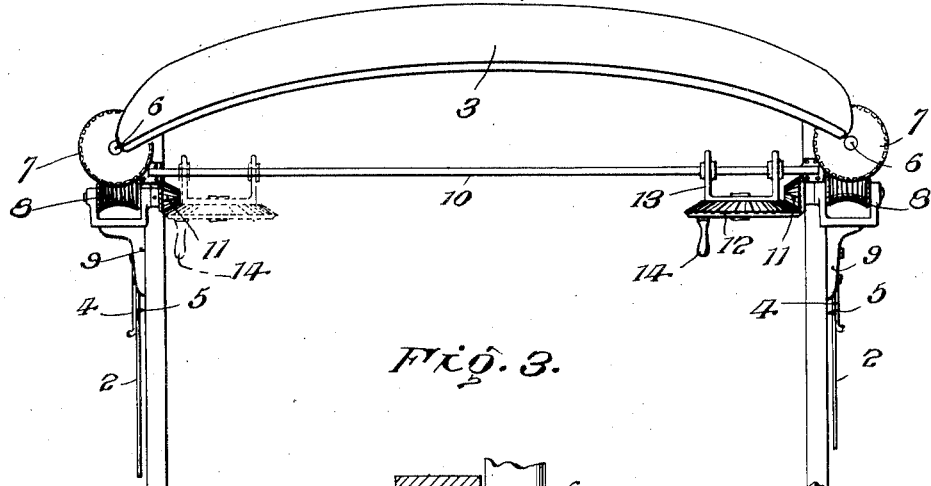
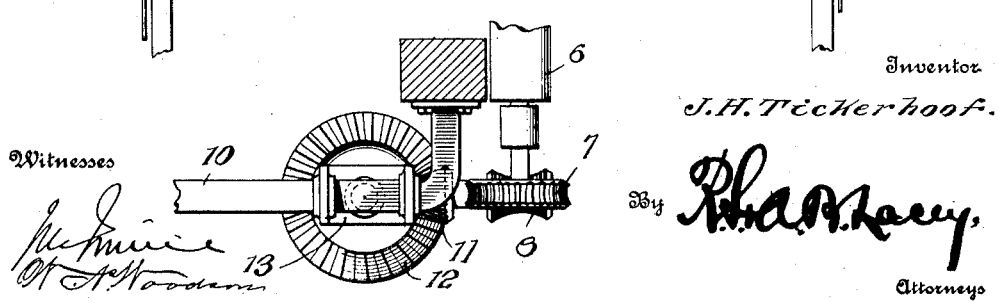
Inventor
J. H. Tickerhoof.
Witnesses
Attorneys

UNITED STATES PATENT OFFICE.

JOHN H. TICKERHOOF, OF PORTAGE, PENNSYLVANIA.

CURTAIN-OPERATING MEANS FOR VEHICLE-TOPS.

No. 879,218.  Specification of Letters Patent.  Patented Feb. 18, 1908.

Application filed February 2, 1907. Serial No. 355,483.

*To all whom it may concern:*

Be it known that I, JOHN H. TICKERHOOF, a citizen of the United States, residing at Portage, in the county of Cambria and State of Pennsylvania, have invented certain new and useful Improvements in Curtain-Operating Means for Vehicle-Tops, of which the following is a specification.

This invention contemplates certain new and useful improvements in vehicle tops and relates particularly to curtain operating means, and the invention has for its object an improved construction of apparatus of this character which may be easily manipulated by the driver from the wagon seat to raise the side curtains of the wagon or other vehicle.

The invention consists in certain constructions and arrangements of parts hereinafter described and claimed.

For a full understanding of the invention and the merits thereof and also to acquire a knowledge of the details of construction of the means for effecting the result, reference is to be had to the following description and accompanying drawings, in which:

Figure 1 is a side elevation of a wagon top provided with the improvements of my invention; Fig. 2 is a front elevation thereof;
and, Fig. 3 is a detail view illustrating the gearing.

Corresponding and like parts are referred to in the following description and indicated in all the views of the drawings by the same reference characters.

Referring to the drawing, the numeral 1 designates the box of a wagon or other vehicle, 2 the side bows of the top, and 3 the top.

4 designates the side curtain of which there are two on opposite sides of the top and each of said curtains is provided with a series of rings 5 adapted to guide the curtain as it is raised and lowered on the bows. Each of the curtains 4 is mounted upon a horizontally extending roller 6 which is journaled in suitable supports in the wagon and is provided at its front end with a worm gear 7. Each worm gear 7 meshes with the worm 8 which is journaled upon a hanger 9 secured to the top support. A supporting rod 10 extends across the top at the front thereof. On the same shaft with each worm 8 is a pinion 11 designed to be meshed with the gear wheel 12 which is journaled on the cross bar of a U-shaped bracket 13 mounted to move or slide back and forth upon the supporting rod 10 so as to be brought into mesh with the pinion 11 at one side of the vehicle top or the other. The gear wheel 12 is provided with an operating handle 14.

From the foregoing description in connection with the accompanying drawing, it is evident that the bracket 13 may be slid to the right or the left so as to bring the gear wheel 12 into mesh with either of the pinions 11 according as it is desired to raise the right hand curtain, or the left hand curtain up. The said gear wheel may then be turned, which will effect the rotation of the pinion 11 with which it is meshed, the consequent movement of the respective worm 8, and the respective worm gear 7, and curtain roller 6.

Having thus described the invention, what is claimed as new is:

1. The combination of a vehicle top, its side bows and side crutains, of rollers upon which the curtains are adapted to wind, supports for said rollers, a rod extending across the top, a bracket slidingly mounted on said rod, a gear wheel journaled on said bracket and adapted to be carried thereby from one side of the top to the other, and gearing operatively connected to the respective rollers and with which said gear wheel is adapted for engagement to raise or lower the curtain at either side of the vehicle.

2. The combination with a vehicle top and its curtains, of rollers upon which the respective side curtains are adapted to wind, each of said rollers being provided with a worm gear, a worm meshing with the respective worm gears, pinions mounted to turn with the respective worms, supports for said worms and pinions, a supporting rod extending transversely of the top at the front thereof, a bracket slidingly mounted on said rod, and a manually operable gear wheel journaled on said bracket and adapted to be carried thereby into engagement with either of said pinions, as and for the purpose set forth.

In testimony whereof I affix my signature in presence of two witnesses.

JOHN H. TICKERHOOF.

Witnesses:
G. H. R. GRAKE,
WM. SPARKS.